(12) United States Patent
Bidwell (10) Patent No.: US 6,725,955 B2
(45) Date of Patent: Apr. 27, 2004

(54) POWERED TRAILER TO PROPEL A TWO WHEELED VEHICLE

(76) Inventor: John L. Bidwell, 2801 Crystal Ct., Fort Collins, CO (US) 80525

( * ) Notice: Subject to any disclaimer, the term of this patent is extended or adjusted under 35 U.S.C. 154(b) by 221 days.

(21) Appl. No.: 10/007,400

(22) Filed: Oct. 18, 2001

(65) Prior Publication Data

US 2002/0038730 A1 Apr. 4, 2002

Related U.S. Application Data (63) Continuation-in-part of application No. 09/414,156, filed on Oct. 8, 1999, now abandoned.

(51) Int. Cl.[7] ............................................... B62D 59/04
(52) U.S. Cl. ............................. 180/11; 180/15; 280/204
(58) Field of Search ............................... 180/11, 15, 16, 180/14.2, 205, 206, 65.5; 280/202, 204, 292

(56) References Cited

U.S. PATENT DOCUMENTS

| | | | | |
|---|---|---|---|---|
| 3,312,299 A | * | 4/1967 | Kuecker ...................... | 180/11 |
| 4,413,692 A | * | 11/1983 | Clifft ........................... | 180/11 |
| 4,461,365 A | * | 7/1984 | Diggs .......................... | 180/11 |
| 5,127,488 A | * | 7/1992 | Shanahan .................... | 180/181 |
| 5,141,067 A | * | 8/1992 | Diggs .......................... | 180/11 |
| 5,816,349 A | * | 10/1998 | Hankins ...................... | 180/11 |
| 5,894,898 A | * | 4/1999 | Catto .......................... | 180/2.2 |
| 6,305,703 B1 | * | 10/2001 | Quick et al. ................. | 280/204 |

FOREIGN PATENT DOCUMENTS

DE    3630031 A1  *  4/1988  ........... B62D/59/04

* cited by examiner

*Primary Examiner*—Avraham Lerner (57) ABSTRACT

A two wheeled trailer is used to propel a two wheeled vehicle such as a bicycle or a scooter. The trailer is powered by an electric motor and at least one battery. The control of the motor is through a potentiometer attached to the handlebars of the vehicle and in electrical communication with a controller. The trailer is attached to the vehicle by an attachment arm that is mounted near the rear axle of the vehicle. A coupler that allows three axes of rotation attaches the trailer to the vehicle.

8 Claims, 6 Drawing Sheets

POWERED TRAILER TO PROPEL A TWO WHEELED VEHICLE

PRIORITY CLAIM

The present application is a continuation in part of application Ser. No. 09/414,156 now abandoned, Powered Trailer to Propel a Two Wheeled Vehicle, John L. Bidwell, inventor, filed Oct. 8, 1999, which is incorporated herein by reference for all it teaches and discloses.

BACKGROUND OF THE INVENTION a. Field of the Invention

The present invention pertains generally to electric vehicles and specifically to an electric powered trailer to push a bicycle or push scooter.

b. Description of the Background

Traditionally, human muscle power has propelled bicycles and push scooters by way of pedaling or pushing. Steep inclines and heavy loads require more muscle power, as well as reduce speed, limiting the performance of the bicycle or push scooter. Various types of motors have been mounted on bicycles and push scooters. However, mounting a motor on the bicycle or push scooter frame compromises power and performance by adding weight to the bicycle or push scooter. In addition, the added weight makes the bicycle or push scooter impractical as a human-powered vehicle. Existing motorized bicycles and push scooters also offer limited cargo hauling capabilities because of their small size, limited weight carrying capabilities, and difficulty balancing large loads.

A crude electric bicycle pusher trailer was constructed prior to 1981 by David A. Ferre. Ferre's trailer is described in page 189 in the *Complete Book of Electric Vehicles*, Sheldon R. Shaket, Copyright 1981. Ferre's trailer did not have a speed controller or an efficient electric motor drive train. The trailer attached high up on the base of the seat, which would cause unstable power conditions. Because of the Ferre's crude power on off switch control of the power, it was recommended that the operator start pedaling the bicycle before engaging the motor.

It would therefore be valuable to provide a method of assisting a bicycle or push scooter that was easily controllable, had large carrying capacity while still being stable, was easily detachable, and did not impart forces onto the bicycle or scooter that were unnatural or difficult for the operator.

SUMMARY OF THE INVENTION

The present invention overcomes the disadvantages and limitations of the prior art by providing a two wheeled trailer that pushes a bicycle or scooter from behind. The trailer mounts to a bicycle near the rear axle of the bicycle using a three axis connector. The connector may include a quick disconnect feature so that the trailer may be removed easily and quickly. The trailer contains a controller, batteries, and a motor that powers one of the two wheels of the trailer. The trailer is controlled by a potentiometer mounted on the handlebars and operated by a rider's thumb or other finger.

The items mounted in the trailer may be mounted very low so that the center of gravity is close to the ground, which improves the handling characteristics. Further, the three axis mount that is attached to the bicycle is done so very near the rear wheel, which is advantageous so that the forces exerted by the trailer onto the bicycle are felt by the rider to be natural and anticipated. The trailer has the advantage that the rider may elect to pedal the bicycle for enjoyment, to assist the trailer, or to travel without the assistance of the trailer.

The trailer has the ability to carry more weight in the form of batteries, motor, and drivetrain components than could be placed on a bicycle frame, allowing the present invention to have greatly increased range and power over such frame mounted options. The trailer may further be outfitted with a cargo container or a flat area whereby large, heavy objects may be transported.

The present invention may therefore comprise a device for propelling a two wheeled vehicle comprising: a driven wheel and a free wheel, the driven wheel and the free wheel being aligned axially to each other and rotatably mounted to a frame; the driven wheel attached to an electrical motor; the electrical motor in electrical communication with a controller; the controller in electrical communication with at least one battery and in further communication with a potentiometer; and the device being attached to the vehicle near the rear axle of the vehicle with a connector that allows three degrees of axial rotation.

The present invention may further comprise a trailer for pushing a two wheeled vehicle comprising: a first wheel and a second wheel; the first wheel being in mechanical communication with a motor and the second wheel being free wheeling; a controller in electrical communication with at least one battery and the motor; a potentiometer in electrical communication with the controller; a connector attached to the vehicle near the rear axle of the vehicle; said connector allowing three orthogonal axes of rotation between the vehicle and the trailer; and the first wheel being offset from a longitudinal centerline of the vehicle.

The present invention may further comprise a method of constructing a two wheeled vehicle using a powered trailer comprising: fabricating a frame, the frame having a hitch that has three orthogonal axes of rotation and being adapted to clamp near the rear axle of a two wheeled vehicle; mounting a first wheel and a second wheel to the frame, the wheels being aligned axially and rotatably attached to the frame; mounting an electric motor to the frame; connecting the motor to the first wheel such that the first wheel is driven by the motor; mounting a controller to the frame; mounting at least one battery to the frame; electrically connecting the motor to the controller; the controller being connected to the battery; and electrically connecting a potentiometer to the controller.

The advantages of the present invention are a low cost and efficient device to assist a rider of a two wheeled vehicle such as a scooter or bicycle. The single attachment point near the rear axle imparts the minimum opposing force that may seem unnatural and unexpected to the novice rider of the device. The two wheeled design may accommodate large cargoes. The simple potentiometer input offers the rider excellent control of the vehicle, while the three axis swivel mount allows the rider to operate the powered vehicle with a similar feel and response as a conventional, unpowered version.

DETAILED DESCRIPTION OF THE INVENTION

Figure 1:
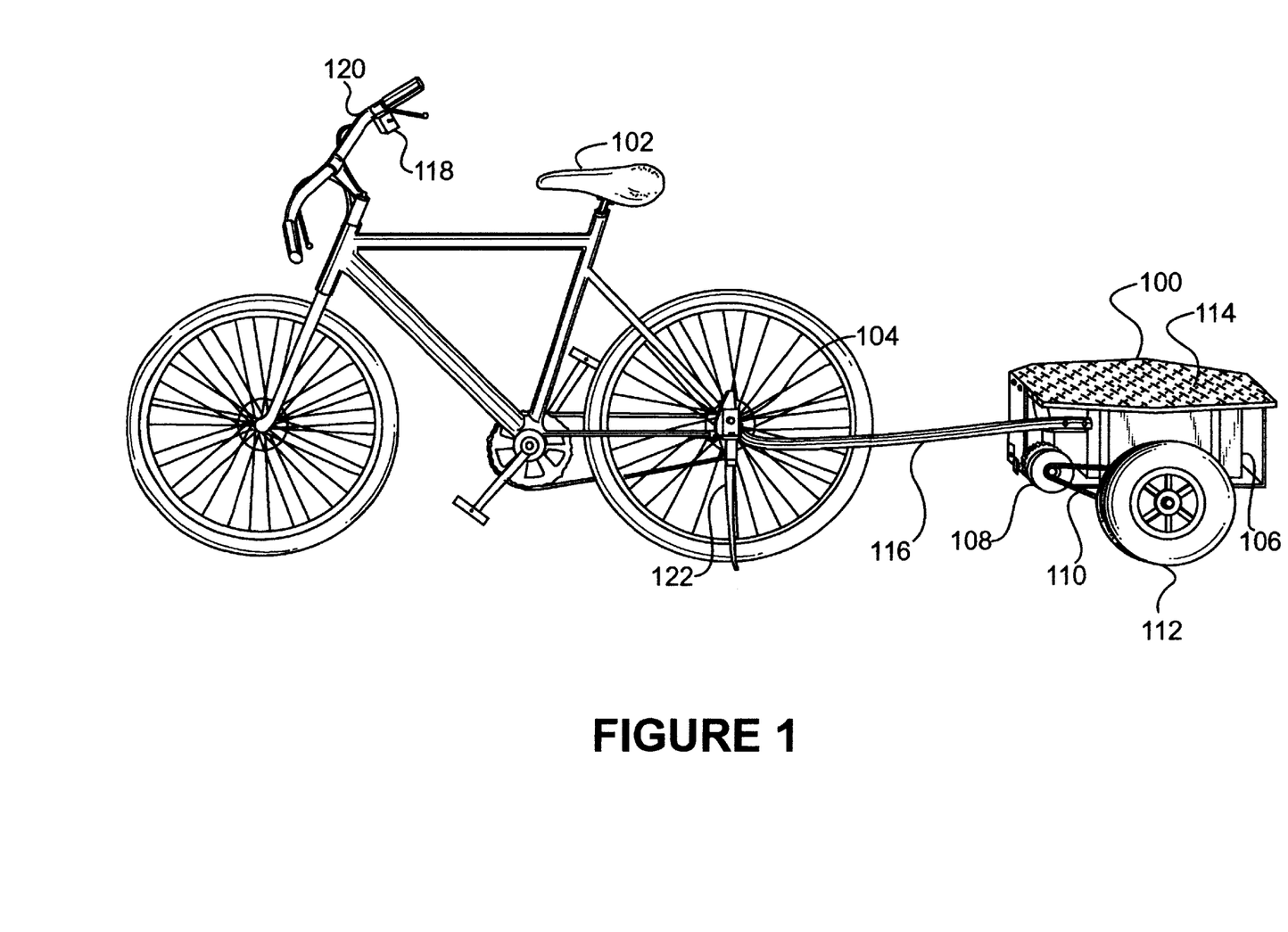
FIG. 1 is a perspective illustration of an embodiment of the present invention attached to a bicycle.

FIG. 1 is a perspective illustration of an embodiment 100 of the present invention attached to bicycle 102. Embodiment 100 is attached to the bicycle 102 near the rear axle 104. The attachment mechanism has three axes of rotation, allowing the bicycle to move in the roll, pitch, and yaw directions with respect to the trailer 100.

The trailer 100 has a body 106, a motor 108, a drive chain 110, and a drive wheel 112. The trailer further has a flat top 114 that may be used for carrying various cargos. The trailer 100 is attached to bicycle 102 by the arm 116. A potentiometer and switch unit 118 is mounted to the handlebar 120 of bicycle 102.

The embodiment 100 may be an aftermarket attachment for a standard bicycle. In such an embodiment, the attachment arm 116 may have a mechanism that attaches to the frame of bicycle 102 using clamps or other mechanisms. The potentiometer and switch unit 118 may further mount onto handlebar 120 using clamps or other mechanisms. For use of the bicycle without the trailer, the mechanism that attaches to the frame of the bicycle may incorporate a quick disconnect system such that the trailer may be removed quickly and reattached at a later time. Further, the wires that connect to the potentiometer and switch mechanism may be disconnected with a connector mounted near the end of the attachment arm 116.

Other embodiments may have a bicycle specially adapted for a powered trailer. Such an embodiment may have an attachment mechanism specially incorporated into the frame of the bicycle to accept the trailer. Further, the attachment point for the trailer may be strengthened to accept the additional loads as the trailer pushes the bicycle during use. Further, the potentiometer and switch unit 118 may be incorporated into the handlebar 120 and any wiring for the switch unit 118 may be incorporated into a quick disconnect coupler for the mechanical attachment of the trailer.

The embodiment 100 uses a two wheeled trailer mounted to the bicycle with a three axis connector. The three axis connector allows the bicycle to pivot in the roll, pitch, and yaw directions. The roll direction allows the bicycle to corner by leaning, which is the conventional method of using a bicycle. The pitch direction allows the bicycle and trailer assembly to go over bumps, curbs, and hills while always maintaining constant contact with the ground on all wheels. The yaw direction allows the bicycle to steer the assembly.

The attachment of the arm 116 to the bicycle 102 near the rear axle imparts the least amount of twisting forces on the bicycle 102 than most other methods of attachment. For a device such as embodiment 100 to be easy and safe to use, an objective is to have the device impart as little awkward and unanticipated forces to the bicycle 102 as possible. A rider who is familiar with riding a bicycle would not be comfortable if the embodiment 100 imparted forces to the bicycle that were drastically different from the normal operation of the bicycle. In the present invention, the attachment of the arm 116 near the rear axle gives an excellent compromise in ease of use and practicality of design. The forces imparted by the trailer, even in tight cornering situations, is natural, anticipated, and forgiving because the forces act near the ground and along the main axis of the bicycle. Further, because the wheels of the trailer mostly carry the weight of the trailer 100, the forces acting on the bicycle 102 are additionally minimized.

The two wheeled trailer has the advantages that the bicycle and trailer assembly is stable while the bicycle is held upright with a kickstand 122, allowing the user to place and secure loads onto the trailer 100 easily without fear of the bicycle falling over. The low center of gravity of the unloaded unit may allow for even more additional weight to be carried on the trailer 100.

The trailer body 106 may be constructed of metal, plastic, or other rigid material capable of handing the loads seen by the trailer 100. The trailer body 106 may house the electric batteries used to power the motor 108 as well as the electronic control unit and other electrical devices as required. The trailer body 106 may be constructed so that the center of gravity is as low as practical. A low center of gravity may be advantageous during cornering and other maneuvers to increase handling. Further, the low center of gravity of the basic trailer 100 may allow for larger loads to be carried on top of flat top 114.

The bicycle 102 may be any type of bicycle or human powered scooter. In some embodiments designed for rough terrain or for heavy loads may employ a mountain bike while others may use a road bike for long distance travel. In general, the addition of a powered trailer may impart more than the normal loads and forces on the bicycle 102. However, in some embodiments, the loads may not be significant enough to warrant any extra ruggedization of the bicycle 102.

The wheels used on the embodiment 100 are inflatable rubber tires mounted on metal rims. Any type of wheel and tire may be used, for example, spoked wheels with inflatable tires or solid rubber tires mounted on solid wheels. Some embodiments may have treaded tires or the tires may be slick. For example, an embodiment used only on dry highway roads with a minimum of gravel, a tire with no treads or a fine tread may be used. In another example, for embodiments used in rain or off road, a deeply grooved tread may be used. In some embodiments, the driven wheel may be a larger size or have different treads than the non-driven, free wheeling wheel. The driven wheel may be larger in width or diameter.

In some embodiments, the wheels may be mounted on suspensions, including springs or shock absorbers. Such embodiments may be favored for use in off road or rough conditions or where large cargoes are being hauled. In some embodiments, an inflated tire of sufficient thickness may be sufficient to provide enough absorption of bumps and such that a suspension is not necessary.

Figure 2:
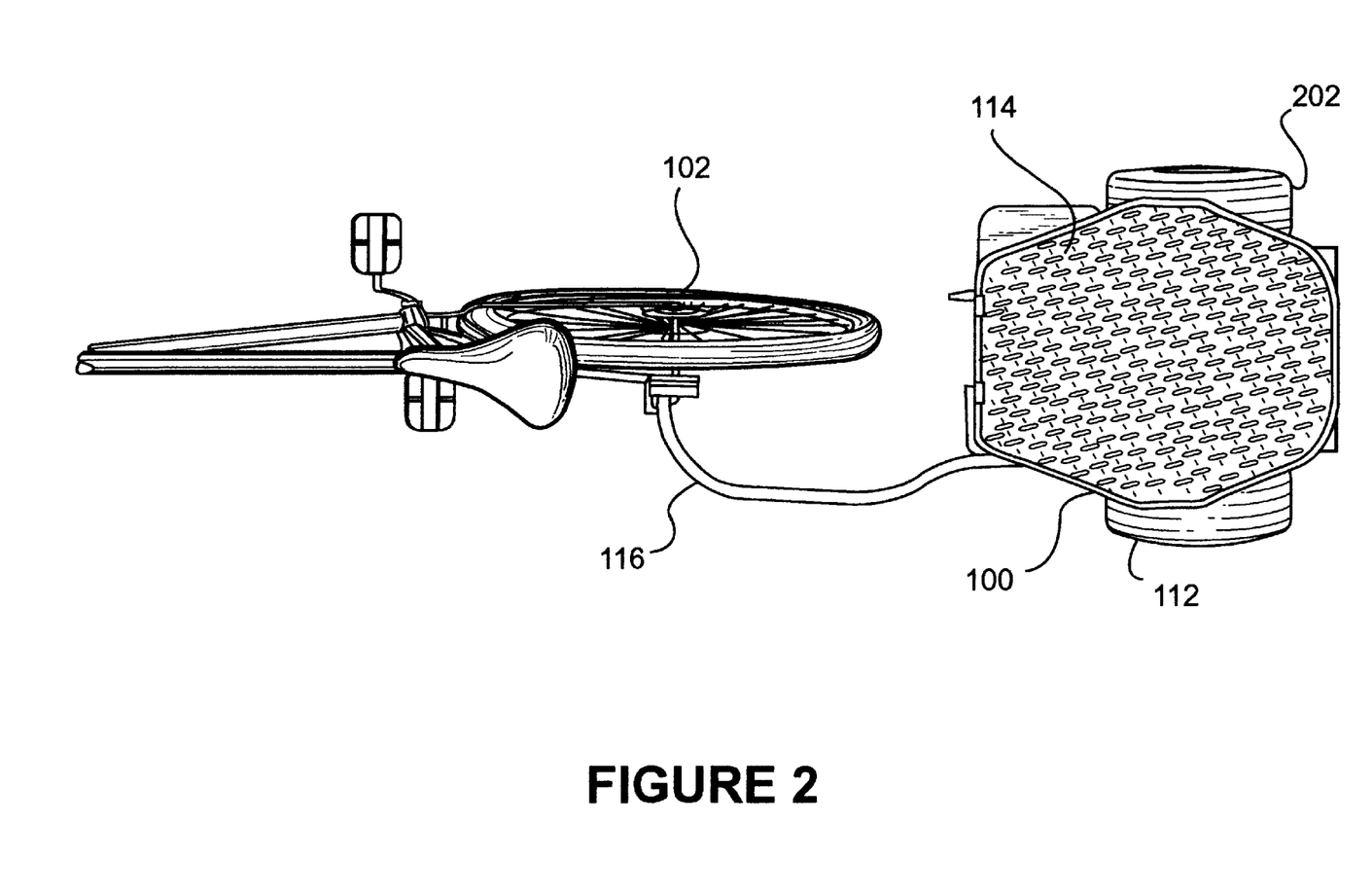
FIG. 2 is a perspective illustration of a top view of the present embodiment of the present invention.

FIG. 2 is a top view illustration of embodiment 100 of the present invention attached to bicycle 102. The present illustration shows the drive wheel 112, a free wheeling wheel 202, the flat top 114, and the attachment arm 116.

The curved shape of arm 116 allows the bicycle 102 to turn without having the rear wheel interfere with the arm 116. The drive wheel 112 may be located on the centerline of the bicycle or it may be located off center as illustrated. In practice, the offset nature of the drive wheel does not pose any handling or drive problems with such an embodiment.

The free wheeling wheel 202 is not powered by the electric motor, however, the wheel 202 may be installed such that the axes of both wheels are collinear. Since one wheel is free wheeling, the trailer 100 may turn a corner without requiring either a differential or having one wheel slip with respect to another. A differential in such an embodiment may add weight plus add significant cost to the unit. Having a solid axle and requiring one wheel to slip with respect to another in a turn adds weight and also adds a force component during a turn wherein the trailer opposes any turn in direction. In the present invention wherein only one wheel is driven, the trailer does not impart such an opposing force during a turn.

With a drive wheel that is offset from the centerline of the bicycle, the trailer may impart a small twisting force during straight ahead motion. However, since the twisting force is imparted into the bicycle near the rear axle, the only component that is felt by the operator is a small roll component forcing the rider to lean slightly. If the connection point were forward or back from the rear axle, the trailer would impart a yaw moment opposing or increasing the force turning the bicycle, respectively. If the connection point were higher than the rear axle, the roll component would be increased, and the increase would impart a significant force opposing a turn during sharp cornering situations.

Figure 3:
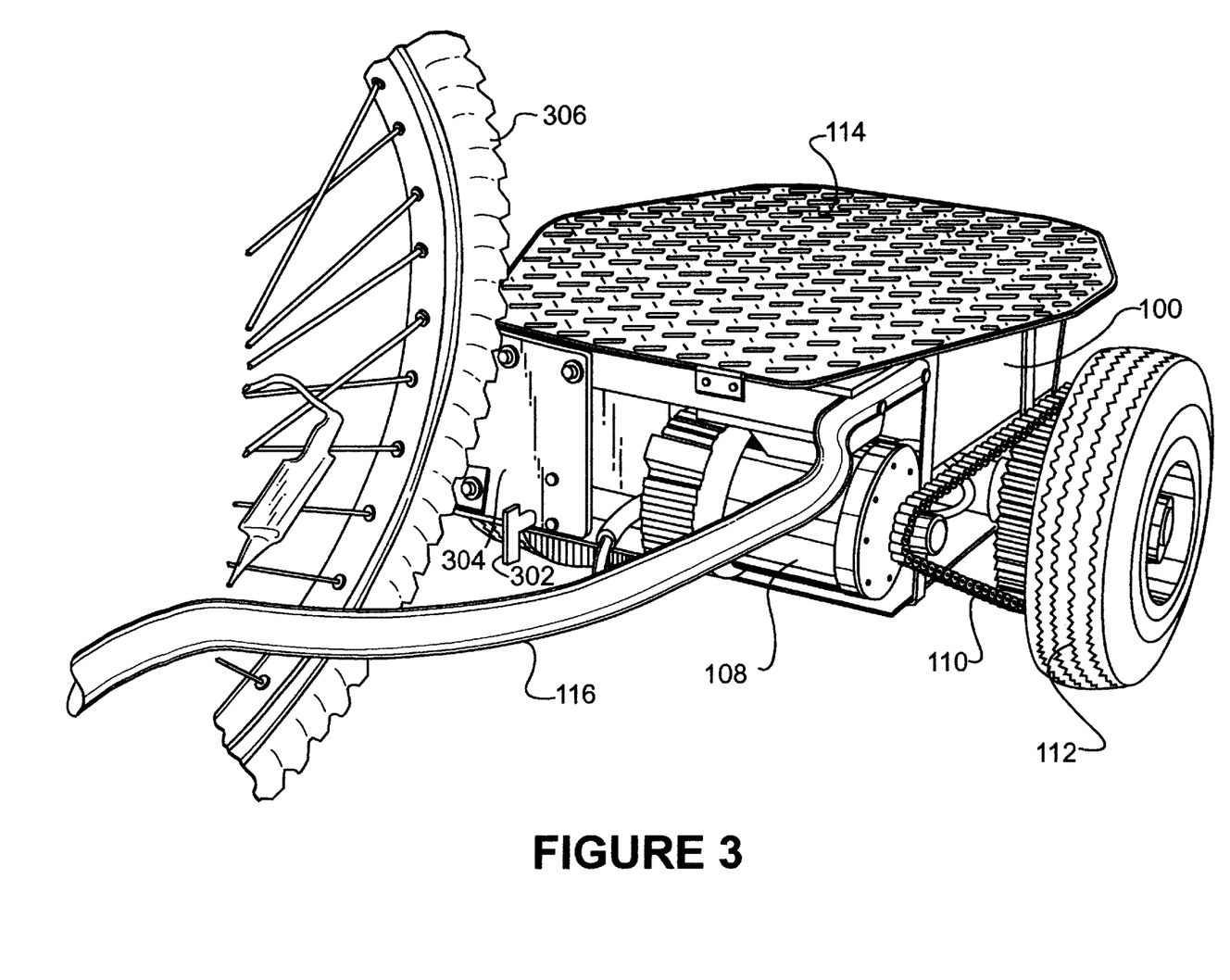
FIG. 3 is another perspective illustration of the present embodiment of the present invention.

FIG. 3 is a perspective illustration of embodiment 100 of the present invention. The present illustration shows the motor 108, drive chain 110, drive wheel 112, flat top 114, and a portion of attachment arm 116. A shut off key 302 is inserted into the electrical control box 304. A portion of bicycle tire 306 is shown in the figure.

The present embodiment uses a chain drive to connect the motor 108 to the drive wheel 112. Alternative embodiments may use other methods of connecting the motor 108 to the drive wheel 112. For example, a toothed belt, v-belt, or other belting may be used instead of a chain. In other embodiments, the motor may have a gear that engages a gear on the drive wheel directly. In another embodiment, the motor may have a wheel that rides on the outside of the drive wheel. Other methods of power transmission are well known in the art and may be employed in various embodiments while keeping within the spirit of the present invention.

The gear ratios between the motor 108 and the drive wheel 112 may be set for different ratios depending on the needs of the rider. For example, a rider who is interested in traveling long distances may elect a higher gear ratio such that the motor 108 turns slower for each revolution of the drive wheel 112. Such an example may give better battery life. For a rider who wishes to have better acceleration, the gear ratio may be such that the motor turns faster for each revolution of the drive wheel 112. Such an example would give the rider better acceleration and more power to carry larger loads or to go uphill, however, the battery life may be less.

Figure 4:
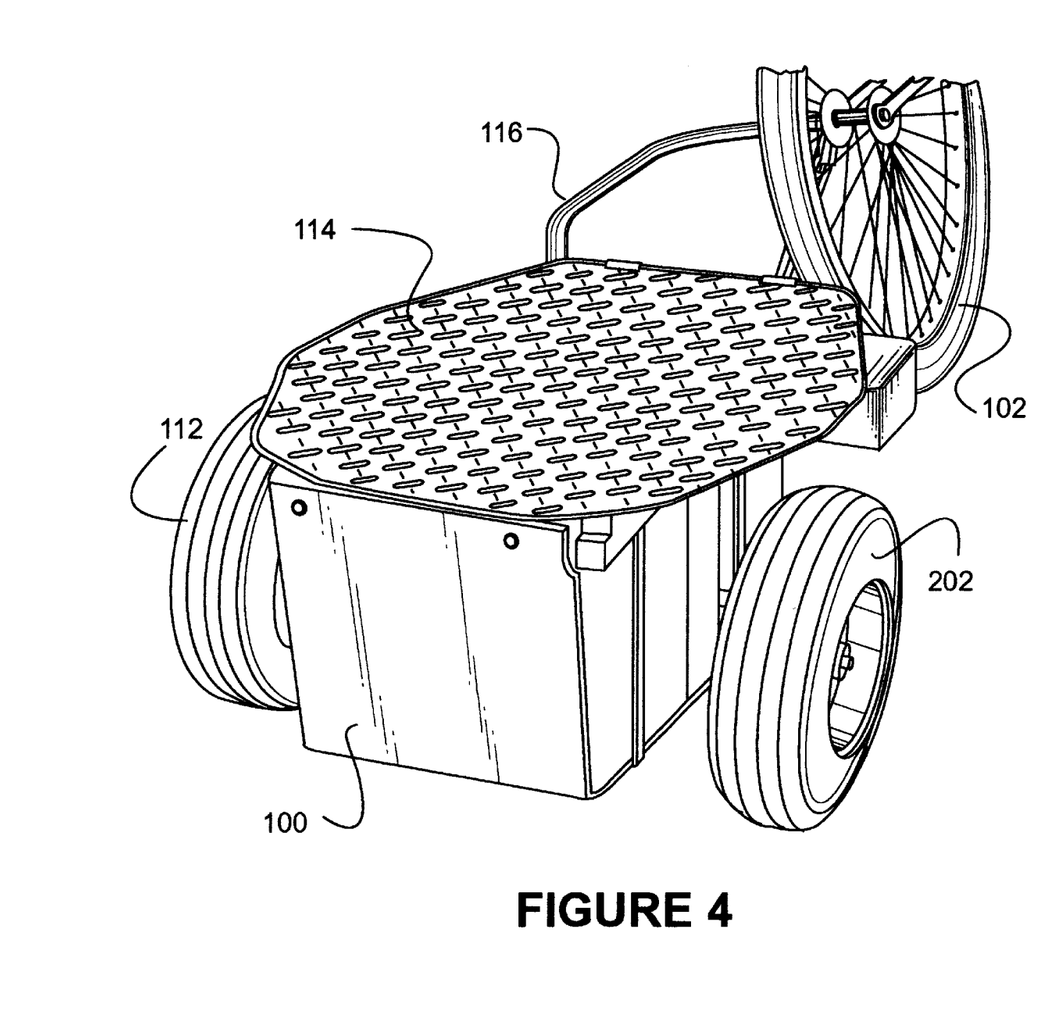
FIG. 4 is a perspective illustration of the present embodiment of the present invention shown from the rear.

FIG. 4 is another perspective illustration of embodiment 100 of the present invention, shown from the rear. The present illustration shows the drive wheel 112, the flat top 114, the attachment arm 116, and the free wheeling wheel 202 attached to bicycle 102.

Figure 5:
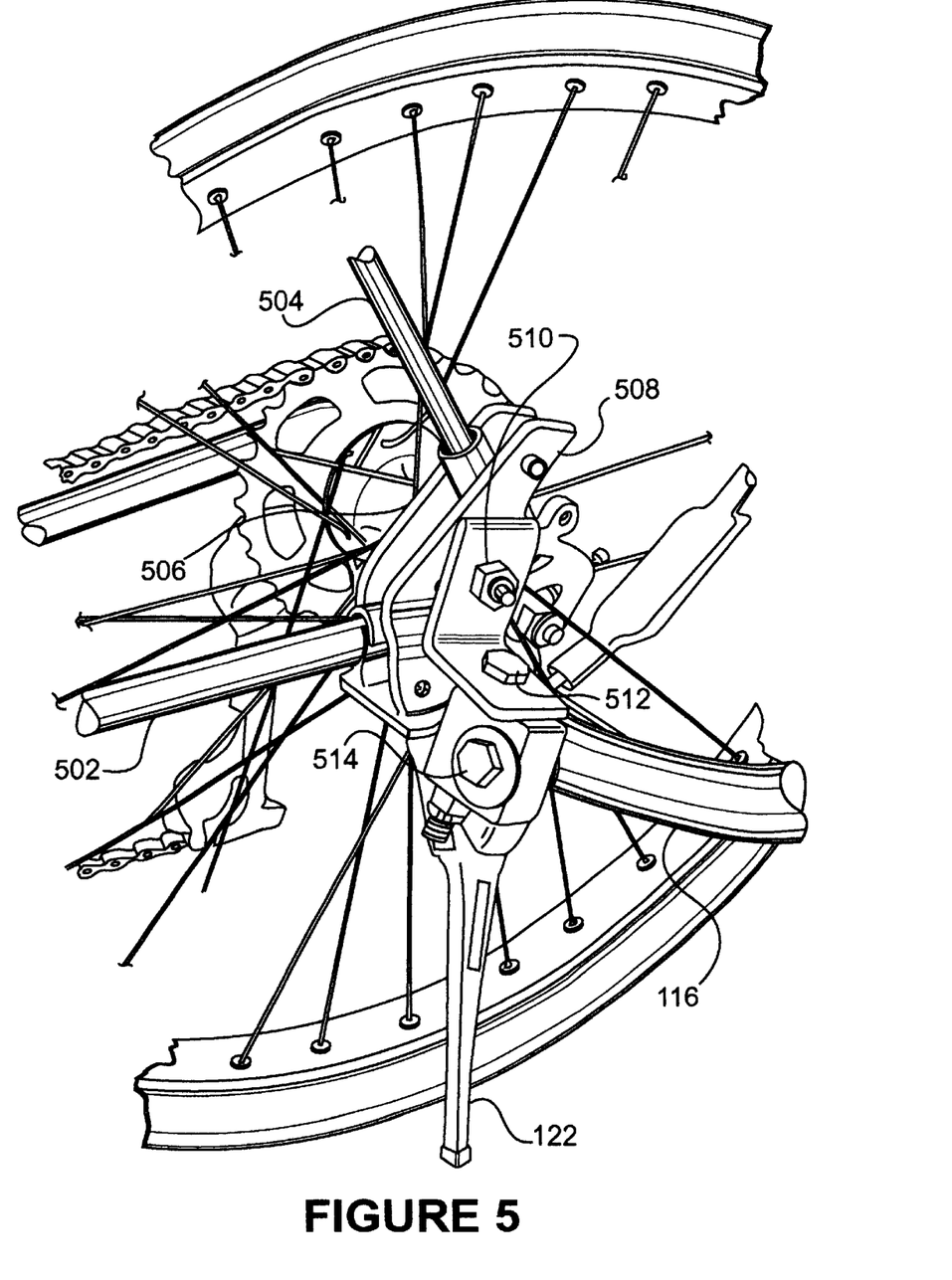
FIG. 5 is a perspective illustration of an embodiment of the present invention showing a detailed view of the attachment mechanism.

FIG. 5 is a perspective view of an embodiment of the kickstand 122 and the attachment of arm 114 to the bicycle. The bicycle horizontal frame member 502 and angled frame member 504 are clamped by kickstand brackets 506 and 508. The arm 114 pivots on the pitch axis through an axis defined by bolt 510, the yaw axis by an axis defined by bolt 512, and the roll axis by an axis defined by bolt 514. The three axes are approximately orthogonal to each other. The bolts 510, 512, and 514 may be installed with locking nuts such that the bracketry allows unrestricted rotation about each axis. Some embodiments may employ bearings, such as ball bearings or bearing sleeves on each axis. Other embodiments may have riveted joints or be configured differently, and those skilled in the art may be able to implement the present invention in many different ways without violating the spirit or intent of the present invention.

Figure 6:
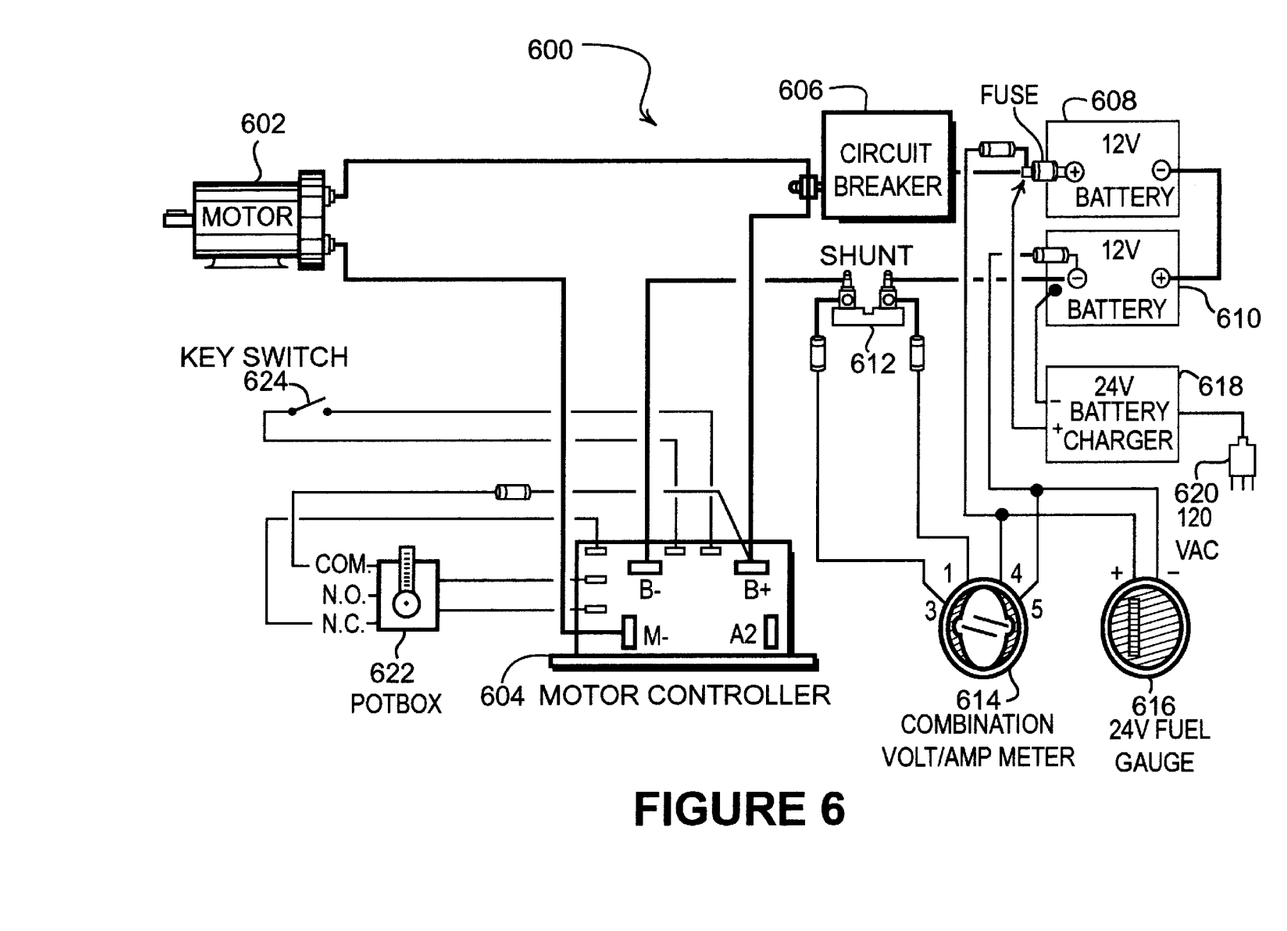
FIG. 6 is a block diagram of the electrical components of an embodiment of the present invention.

FIG. 6 illustrates a diagram of the electrical system 600 of an embodiment of the present invention. A motor 602 is connected to a motor controller 604. One pole of the motor is connected to a circuit breaker 606 that serves as the main shut off for the entire system. The circuit breaker 606 connects to one of two batteries 608 and 610 that are connected in series. The negative pole of the battery 610 is connected to a shunt 612 that is used to measure the amperage in the volt/amp meter 614. A 24V 'fuel gage' 616 is connected across the batteries 608 and 610. A battery charger 618 is also connected across the poles of the batteries 608 and 610 and connects to 120VAC plug 620. A potbox 622 serves as the variable control to the motor controller 604. A key switch 624 also is an input to the motor controller 604.

The motor 602 in the present embodiment may be a 24VDC motor. The size of the motor and its power requirements may vary for different applications and embodiments. In general, a half horsepower motor or larger may be suited for an embodiment designed to push a large man on a bicycle.

The motor controller 604 may be a pulse width modulation controller, a variable reluctance controller, a phase controller, or other motion controller that can vary the speed of a motor. Several types of controllers are known in the art and can be applied to the present invention while still maintaining within the spirit of the present invention. The pot box 622 and key switch 624 are the user inputs to the motor controller 604 that cause the speed of the motor 602 to be varied. In the present embodiment, the pot box 622 and key switch 624 may be mounted on the handlebar so that the rider may adjust the pot box 622 with a thumb or finger. In some embodiments, the pot box 622 may be mounted as a twist grip wherein the rider uses the entire hand to twist the lever on the pot box 622. The key switch 624 may be a simple toggle switch, a switch activated with a key, or other on/off device that may be used to ensure that the trailer does not activate when it is not wanted. The key switch 624 may be omitted in some embodiments.

The motor controller 604 may include regenerative braking. Such a controller may run the motor 602 as a generator, which acts as a brake and recharges the batteries during the braking action.

The combination volt/amp meter 614 and 24V fuel gage 616 maybe mounted on the handlebars for the rider to see during the course of using the trailer. In some embodiments, the volt/amp meter 614 and/or the fuel gage 616 may be omitted or mounted in another place other than the handlebars, such as on the frame of the bicycle or on the trailer itself.

The battery charger 618 and 120V plug 620 may be an integral unit to the trailer or may be a separate device used when the trailer is parked. When the charger is integral to the trailer, the trailer may be recharged at any place without having to have special charging apparatus. When the charger is separate, the unit is lighter and may either accept more weight as cargo, or may travel longer distances on the same battery charge.

The batteries 608 and 610 are shown connected in series. In some embodiments, a single battery or an array of batteries may be used. Batteries may be connected in parallel or series, depending on the application requirements of the particular embodiment.

The present invention has the distinct elements of a two wheeled trailer that is used to push a two wheeled vehicle, such as a bicycle or scooter. The trailer is attached to the vehicle with a mechanism that allows three axes of rotation between the trailer and the vehicle. Further, the mechanism mounts near the rear wheel axis and allows the rider to operate the vehicle such that the feel of the vehicle under power is as similar to the non-assisted operation as possible. In other words, the feel of the bicycle or scooter as it leans into and through a turn should be as similar as possible as doing the same maneuver with a bicycle that does not have a powered trailer pushing it.

Since the three axis coupler is mounted as close to the rear axle as practical, any twisting forces, or off axis forces especially present during tight cornering, may be minimized and easily controlled by the rider. Further, by mounting the coupler near the rear axle, the roll forces may be lessened than if the coupler was mounted near the seat post. By mounting the coupler near the rear axle in the longitudinal direction of the bicycle, the forces exerted by the trailer during a corner are not felt in the yaw direction.

The attachment of the trailer to one side of the bicycle does not compromise the performance of the trailer in any fashion. The attachment arm may be designed to allow as much turning movement as necessary so that the rear tire of the bicycle does not interfere with the arm.

Another aspect of the present invention is the variable control system used to control the motor. The use of a simple potentiometer operated by the rider's hand is an intuitive and simple method of controlling the speed of the trailer. Further, the ability to change the speed from off to slow to fast allows the rider great flexibility, control, and a sense of sureness and comfort as the rider operates the vehicle.

A single wheel powering the trailer offers many advantages to the present invention. For example, because one wheel is powered and one is free wheeling, the trailer is able to turn without having one wheel slip or requiring a differential. Such a design is exceptionally useful when the trailer is detached from the bicycle or scooter and the rider is repositioning the trailer. Since the wheels are not rigidly attached to a common axle, the trailer is easy to turn and maneuver.

The present invention may be added to existing bicycles without extensive modifications. A set of brackets may be clamped to a frame of an existing bicycle to attach the trailer and the controls may be mounted on the handlebars of the bicycle to complete the installation. Further, the present invention may be adapted to be quickly removable from the bicycle for storage or so that the rider may enjoy the use of the bicycle without the trailer.

In some embodiments, the drive wheel may have a one way clutch or other mechanism such that the wheel may be free wheeling when the electric motor is turned off and the rider is coasting down a hill. Such an embodiment may not include a regenerative braking feature. However, such an embodiment may allow a rider to pedal the bicycle in the conventional fashion when the batteries in the trailer are depleted.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A device for propelling a two wheeled vehicle comprising:
    a driven wheel and a free wheel, said driven wheel and said free wheel being aligned axially to each other and rotatably mounted to a frame;
    said driven wheel attached to an electrical motor; said electrical motor in electrical communication with a controller; said controller in electrical communication with at least one battery and in further communication with a potentiometer; and
    said device being attached to said vehicle near the rear axle of said vehicle with a connector that allows three degrees of axial rotation.

2. The device of claim 1 wherein said driven wheel is offset from the longitudinal centerline of said vehicle.

3. The device of claim 1 wherein said controller comprises regenerative braking.

4. The device of claim 1 further comprising a clutch mounted to said driven wheel wherein said driven wheel may spin when said motor is not driving said wheel forward.

5. A trailer for pushing a two wheeled vehicle comprising:
    a first wheel and a second wheel; said first wheel being in mechanical communication with a motor and said second wheel being free wheeling;
    a controller in electrical communication with at least one battery and said motor;
    a potentiometer in electrical communication with said controller; and
    a connector attached to said vehicle near the rear axle of said vehicle; said connector allowing three orthogonal axes of rotation between said vehicle and said trailer.

6. The trailer of claim 5 wherein said controller further comprises regenerative braking.

7. The trailer of claim 5 wherein said first wheel is offset from the longitudinal centerline of said vehicle.

8. The trailer of claim 5 further comprising a clutch mounted on said first wheel such that said first wheel may spin freely when said motor is not driving said wheel forward.

* * * * *